W. H. ACKERMAN.
TROLLEY HARP.
APPLICATION FILED FEB. 10, 1916.

1,291,348.

Patented Jan. 14, 1919.
2 SHEETS—SHEET 1.

WITNESSES:
Chas H Young

INVENTOR.
Walter H. Ackerman
BY Parsons & Bodell
ATTORNEYS.

W. H. ACKERMAN.
TROLLEY HARP.
APPLICATION FILED FEB. 10, 1916.

1,291,348.

Patented Jan. 14, 1919.
2 SHEETS—SHEET 2.

WITNESSES:
Chas H. Young

INVENTOR.
Walter H. Ackerman,
BY Parsons & Bodell
ATTORNEYS.

UNITED STATES PATENT OFFICE.

WALTER H. ACKERMAN, OF JAMESTOWN, NEW YORK.

TROLLEY-HARP.

1,291,348.	Specification of Letters Patent.	Patented Jan. 14, 1919.

Application filed February 10, 1916. Serial No. 77,418.

*To all whom it may concern:*

Be it known that I, WALTER H. ACKERMAN, a citizen of the United States, and a resident of Jamestown, in the county of Chautauqua and State of New York, have invented a certain new and useful Trolley-Harp, of which the following is a specification.

This invention has for its object the production of a swiveled trolley harp which is particularly simple and economical in construction and highly efficient and durable in use, and it consists in the novel features hereinafter set forth and claimed.

In describing this invention, reference is had to the accompanying drawings in which like characters designate corresponding parts in all the views.

Figure 1:
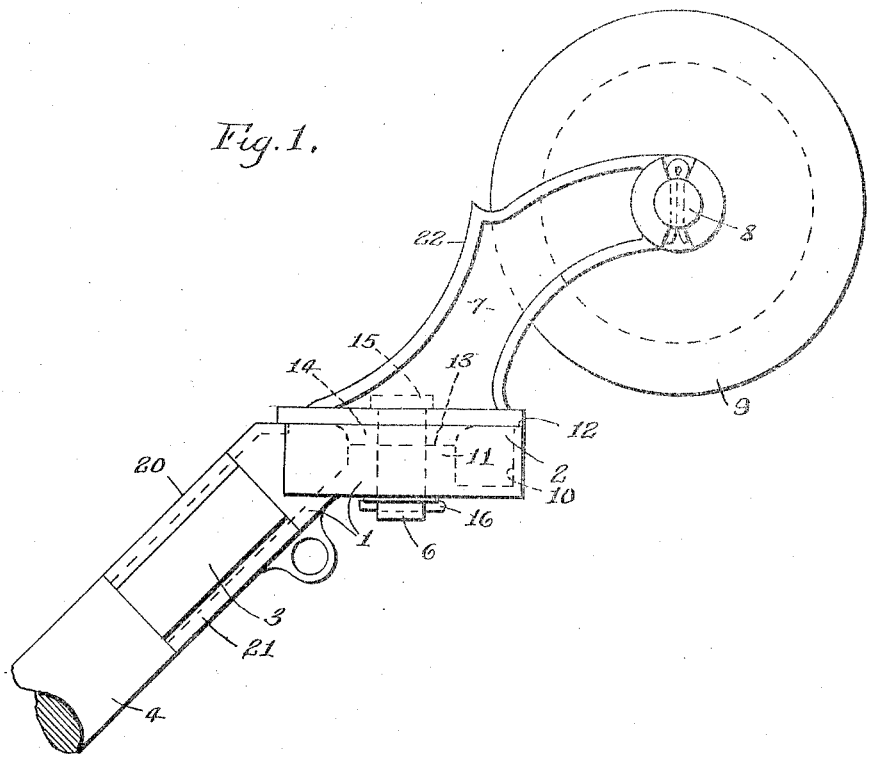
Figure 1 is an elevation of a trolley harp embodying my invention, the contiguous portion of a trolley pole being also shown.
Figure 2:
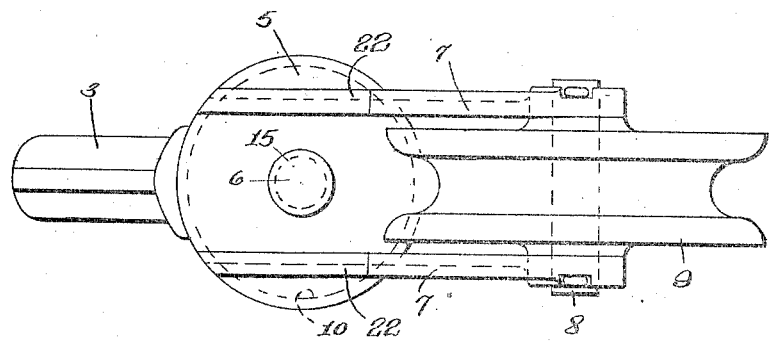
Fig. 2 is a plan view of parts seen in Fig. 1, the pole being omitted.

1 designates the body of the trolley harp which includes a platform 2 and a downwardly and forwardly inclined hollow stem 3 for coupling the trolley harp to the pole 4.

5 is the base of the upper portion or harp proper, this base being connected to the platform 2 by a vertically extending pivot 6, and having upwardly and rearwardly extending arms 7 which carry the axle 8 of the trolley wheel 9, this axle being located in the rear of the pivot 6 so that the trolley wheel trails and hence more readily turns and passes the frogs than it would if the axle were directly above the pivot 6.

The platform 2 and the base 5 are here shown as formed with inner and outer concentric bearing faces preferably arranged in different horizontal planes; and spring means are located between said bearing faces and act on the base 5 in opposite directions to resist swiveling of the base 5 and to return the base 5 and trolley wheel to central position.

As here illustrated, the platform 2 is formed with an annular channel 10 opening through its upper face, this channel providing a central hub 11, which is lower than the upper face or edge 12 of the outer annular wall of the platform. The upper face 13 of the hub 11 constitutes one of the bearing faces of the platform, and the edge face 12 of the outer wall of the channel 10 constitutes the other of the bearing faces thereof.

The base 5 is also formed with a central hub 14 on its lower side which bears on the upper end of the hub 11. The outer margin of the base 5 bears on the bearing face 12 of the platform.

The pivot 6 extends axially through the hubs 11, 14, the head 15 of the pivot 6 being exposed between the arms 7 in front of the wheel 9. The pivot 6 is held in position by a split key 16 extending through the lower end of the pivot.

Figure 3:
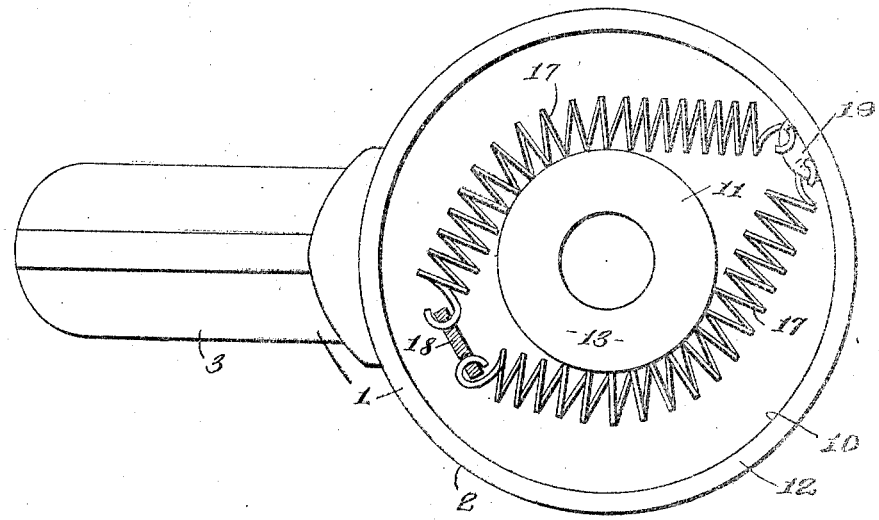
Fig. 3 is an enlarged plan view of the body of the trolley harp.
Figure 4:
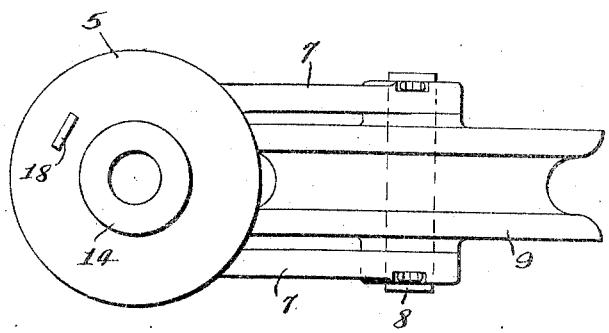
Fig. 4 is an enlarged plan view of the upper portion of the trolley harp, which is swiveled to the lower portion or body.

The spring means is here shown as a pair of coil tension springs 17 located in the channel 10 and extending on opposite sides of the hub 11, the spring 17 being secured at corresponding ends to a shoulder 18 depending from the base 5 into the channel 10, and at their other ends to a lug 19 provided on the inner face of the annular wall of the platform. The lug 19 and the shoulder 18 are normally located diametrically opposite each other, and are preferably located on opposite sides of a diameter of the platform which is arranged at an angle to a diameter arranged in a vertical plane containing the axis of the pole coupling or stem 3 as shown in Fig. 3, in contradistinction to being located on opposite sides of the latter diameter. That is the diameter passing through the lug 19 and shoulder 18 normally extends crosswise of the wire on which the trolley wheel runs. The spring means act more efficiently on the trolley wheel to resist swiveling and to return the wheel to its normal position after swiveling than when the spring means are arranged centrally with, that is, straight with the pole or wire. The coupling 3 is provided with suitable ribs 20, 21 on the upper and lower sides thereof for engaging the cross wire when a trolley slips off the overhead or feed wire and it is also provided with guards 22 on the front sides of the arms 7 in front of the wheel 9.

My trolley harp is particularly advantageous in that it is simple and economical in construction and highly efficient in use owing to the arrangement of the spring means.

What I claim is:

1. A trolley harp comprising a body including a platform having inner and outer concentric bearing faces on the upper side thereof, and an annular recess between said bearing faces, the inner bearing face being provided on the top of a centrally located boss, a base mounted on the platform and having bearing faces complemental to the former bearing faces and connected to the platform by a vertical pivot extending through said boss, the base also having upwardly extending arms for supporting the trolley wheel and springs acting on the base in opposite directions and located in the annular recess, substantially as and for the purpose described.

2. A trolley harp comprising a body including a platform having inner and outer concentric bearing faces on the upper side thereof, and an annular recess between said bearing faces, the inner bearing face being provided on the top of a centrally located boss, a base mounted on the platform and having bearing faces complemental to the former bearing faces and connected to the platform by a vertical pivot extending through said boss, the base also having upwardly extending arms for supporting the trolley wheel, and springs acting on the base in opposite directions and located in the annular recess, the springs being connected at like ends to the platform, and at their other ends to the base and having their intermediate portions extending around the said boss, substantially as and for the purpose specified.

In testimony whereof, I have hereunto signed my name, at Jamestown, in the county of Chautauqua, in the State of New York, this 12th day of November, 1915.

WALTER H. ACKERMAN.

Copies of this patent may be obtained for five cents each, by addressing the "Commissioner of Patents, Washington, D. C."